(12) United States Patent
Underys et al.

(10) Patent No.: US 10,870,900 B2
(45) Date of Patent: Dec. 22, 2020

(54) HIGH TOUGHNESS MARTENSITIC STAINLESS STEEL AND RECIPROCATING PUMP MANUFACTURED THEREWITH

(71) Applicant: A. Finkl & Sons Co., Chicago, IL (US)

(72) Inventors: Algirdas Underys, Arlington Heights, IL (US); Louis-Philippe Lapierre, Chicago, IL (US)

(73) Assignee: A. Finkl & Sons Co., Chicago, IL (US)

( * ) Notice: Subject to any disclaimer, the term of this patent is extended or adjusted under 35 U.S.C. 154(b) by 276 days.

(21) Appl. No.: 15/872,531

(22) Filed: Jan. 16, 2018

(65) Prior Publication Data
US 2018/0355449 A1    Dec. 13, 2018

Related U.S. Application Data

(60) Provisional application No. 62/516,461, filed on Jun. 7, 2017.

(51) Int. Cl.
*C21D 6/00* (2006.01)
*C22C 38/02* (2006.01)
(Continued)

(52) U.S. Cl.
CPC ............. *C21D 6/008* (2013.01); *C21D 1/18* (2013.01); *C21D 1/25* (2013.01); *C21D 6/004* (2013.01);
(Continued)

(58) Field of Classification Search
CPC .................................. C21D 6/008; C21D 1/18
See application file for complete search history.

(56) References Cited

U.S. PATENT DOCUMENTS 5,714,114 A * 2/1998 Uehara .................... C22C 38/20
148/325
6,793,744 B1   9/2004 Jung
(Continued)

FOREIGN PATENT DOCUMENTS

| CN | 105420639 | 3/2016 |
| EP | 3228716 A1 | 10/2017 |

(Continued)

OTHER PUBLICATIONS

Metglobe ("Stainless Steel Grades" retrieved from https://www.metglobe.com/Stainless%20Steel%20Grades.pdf, date of publication of Oct. 17, 2013 provided by web.archive.org ).*
(Continued)

*Primary Examiner* — Abiy Teka
*Assistant Examiner* — Michael Quandt
(74) *Attorney, Agent, or Firm* — von Briesen & Roper, s.c.

(57) ABSTRACT

A reciprocating pump is disclosed. The reciprocating pump may comprise a power end, and a fluid end operatively connected to the power end. The fluid end may include a plunger, a cylinder configured to operatively engage the plunger, and an end block. The plunger, the cylinder, and the end block of the fluid end may each be fabricated from a high toughness martensitic stainless steel composition comprising between 11.50% and 17.00% by weight chromium, between 3.50% and 6.00% by weight nickel, between 0.30% and 1.50% by weight molybdenum, between 0.01% and 0.20% by weight vanadium, and iron.

17 Claims, 7 Drawing Sheets

(51) Int. Cl.
*C22C 38/04* (2006.01)
*C22C 38/06* (2006.01)
*C22C 38/44* (2006.01)
*C22C 38/46* (2006.01)
*C22C 38/48* (2006.01)
*F04B 53/16* (2006.01)
*C21D 9/00* (2006.01)
*F04B 15/02* (2006.01)
*F04B 53/00* (2006.01)
*C21D 1/18* (2006.01)
*C21D 1/25* (2006.01)
*F04B 1/0421* (2020.01)
*C22C 38/00* (2006.01)
*F04B 9/04* (2006.01)
*F04B 35/01* (2006.01)
*F04B 39/00* (2006.01)
*F04B 39/12* (2006.01)
*F04B 53/14* (2006.01)
*F16H 21/18* (2006.01)

(52) U.S. Cl.
CPC ............... *C21D 6/005* (2013.01); *C21D 9/00* (2013.01); *C21D 9/0068* (2013.01); *C22C 38/002* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *F04B 1/0421* (2013.01); *F04B 15/02* (2013.01); *F04B 53/007* (2013.01); *F04B 53/16* (2013.01); *C21D 2211/008* (2013.01); *F04B 9/045* (2013.01); *F04B 35/01* (2013.01); *F04B 39/0094* (2013.01); *F04B 39/122* (2013.01); *F04B 53/006* (2013.01); *F04B 53/14* (2013.01); *F05C 2201/046* (2013.01); *F16H 21/18* (2013.01)

(56) References Cited

U.S. PATENT DOCUMENTS

| | | | |
|---|---|---|---|
| 8,480,817 B2* | 7/2013 | Jain | C21D 6/004 148/226 |
| 9,435,333 B2 | 9/2016 | McCoy et al. | |
| 10,344,758 B2* | 7/2019 | Underys | C22C 38/02 |
| 2008/0080994 A1 | 4/2008 | Gambler | |
| 2011/0058638 A1* | 3/2011 | Ahlfeld | G21C 1/026 376/456 |
| 2014/0331856 A1* | 11/2014 | Ramos | F16J 1/00 92/172 |
| 2015/0367319 A1* | 12/2015 | Kufeld | B01J 19/2435 703/1 |
| 2016/0130679 A1* | 5/2016 | Cober | C21D 9/0068 148/219 |
| 2016/0289785 A1* | 10/2016 | Matsuzawa | C21D 9/40 |
| 2017/0292179 A1* | 10/2017 | Hackett | C22C 38/001 |
| 2017/0306464 A1* | 10/2017 | Sherif | C22C 38/04 |
| 2018/0044759 A1* | 2/2018 | Schulz | C21D 8/0226 |
| 2018/0209441 A1* | 7/2018 | Yacobucci | F04D 29/2205 |
| 2018/0298458 A1* | 10/2018 | Lapierre | C22C 38/46 |
| 2019/0127821 A1* | 5/2019 | Schulz | C21D 8/0226 |

FOREIGN PATENT DOCUMENTS

| | | |
|---|---|---|
| FR | 2439309 A1 | 5/1980 |
| GB | 2044347 A | 10/1980 |

OTHER PUBLICATIONS

AK Steel (Stainless Steel Comparator, Dec. 15, 2015).*
Cheung, et al. ("Selection of Equivalent Steel Materials to European Steel Materials Specifications", Mar. 2015).*
R.D.K, Misra et al., "An Analysis of Grain Boundary Cohesion in Precipitation Hardened Stainless Steel", Received Jan. 21, 1993, vol. 28, pp. 1531-1536, 1993 Printed in the U.S.A.—09-56-716X/93 Copyright (c) 1993 Pergamon Press Ltd.
R.D.K.Misra et al., "On Variation of Impact Toughness in 17-4 Precipitation Hardened Stainless Steel", Received Feb. 11, 1987. vol. 21, pp. 1067-1070, 1987,—0036-9748/87.
European Search Report related to Application No. EP 18161083.3 dated Jul. 23, 2018.

* cited by examiner

HIGH TOUGHNESS MARTENSITIC STAINLESS STEEL AND RECIPROCATING PUMP MANUFACTURED THEREWITH

CROSS-REFERENCE TO RELATED APPLICATION

This is a non-provisional U.S. patent application claiming priority under 35 U.S.C. § 119(e) to U.S. provisional patent application No. 62/516,461 filed on Jun. 7, 2017.

TECHNICAL FIELD

This disclosure generally relates to high toughness martensitic stainless steel compositions and, more particularly, to fluid ends of reciprocating pumps made from same.

BACKGROUND

A reciprocating pump may be configured to propel a treatment material, such as, but not limited to, concrete, an acidizing material, a hydraulic fracturing material or a proppant material, into a gas or oil wellbore. The reciprocating pump may include a power end and a fluid end, with the power end including a motor and a crankshaft rotationally engaged with the motor. Moreover, the power end may include a crank arm rotationally engaged with the crankshaft.

The fluid end may include a connecting rod operatively connected to the crank arm at one end and to a plunger at the other end, a cylinder configured to operatively engage the plunger, and an end block configured to engage the cylinder. The end block may have an inlet port, an outlet port, and a first bore extending between the inlet port and the outlet port. Moreover, the end block may include a cylinder port and a cylinder bore extending between the cylinder port and the first bore.

In operation, the motor may rotate the crankshaft, which in turn reciprocates the plunger inside the cylinder via the interconnecting crank arm and the connecting rod. As the plunger reciprocates, the treatment material may be moved into the end block through the inlet port and propelled out of the end block through the outlet port under pressure into the gas or oil wellbore.

As the demand for hydrocarbons has increased, hydraulic fracturing companies have moved into drilling more complex fields such as Haynesville Shale. Where older formations could be fractured at 9000 pounds per square inch (PSI), Haynesville Shale commonly requires pumping pressure upwards of 13000 PSI. Moreover, where older formations could utilize less abrasive proppant materials, Haynesville Shale customarily requires a highly abrasive proppant such as bauxite. The higher pumping pressure and utilization of more abrasive proppant materials has led to decreased fluid end life, and thus higher costs associated with replacement end blocks and pumps.

The present disclosure is therefore directed to overcoming one or more problems set forth above and/or other problems associated with known reciprocating pump fluid ends.

SUMMARY

In accordance with one aspect of the present disclosure, a reciprocating pump is disclosed. The reciprocating pump may comprise a power end having a motor, a crankshaft rotationally engaged with the motor, and a crank arm rotationally engaged with the crankshaft. The reciprocating pump may further comprise a fluid end operatively connected to the power end. The fluid end may include a plunger, a cylinder configured to operatively engage the plunger, and an end block. The plunger, the cylinder, and the end block of the fluid end may each be fabricated from a high toughness martensitic stainless steel composition comprising between 11.50% and 17.00% by weight chromium, between 3.50% and 6.00% by weight nickel, between 0.30% and 1.50% by weight molybdenum, between 0.01% and 0.20% by weight vanadium, and iron.

In accordance with another aspect of the present disclosure, an end block of a reciprocating pump is disclosed. The end block may comprise a body, a first bore extending through the body between an inlet port and an outlet port, and a cylinder bore extending through the body between a cylinder port and the first bore. The body of the end block may be fabricated from a high toughness martensitic stainless steel composition comprising between 0.00% and 0.06% by weight carbon, between 11.50% and 17.00% by weight chromium, between 3.50% and 6.00% by weight nickel, between 0.30% and 1.50% by weight molybdenum, between 0.01% and 0.20% by weight vanadium, and iron.

In another aspect of the present disclosure, a high toughness martensitic stainless steel composition is disclosed. The high toughness martensitic stainless steel composition may comprise between 0.00% and 0.06% by weight carbon, between 0.00% and 1.50% by weight manganese, between 0.000% and 0.040% by weight phosphorus, between 0.000% and 0.030% by weight sulfur, between 0.00% and 0.70% by weight silicon, between 11.50% and 17.00% by weight chromium, between 3.50% and 6.00% by weight nickel, between 0.30% and 1.50% by weight molybdenum, between 0.01% and 0.20% by weight vanadium, between 0.00% and 0.20% by weight niobium, between 0.00% and 0.060% by weight aluminum, and iron. A ratio of niobium to carbon in the high toughness martensitic stainless steel composition may be 6 or less.

These and other aspects and features of the present disclosure will be more readily understood when read in conjunction with the accompanying drawings.

DETAILED DESCRIPTION OF THE DISCLOSURE

Figure 1:
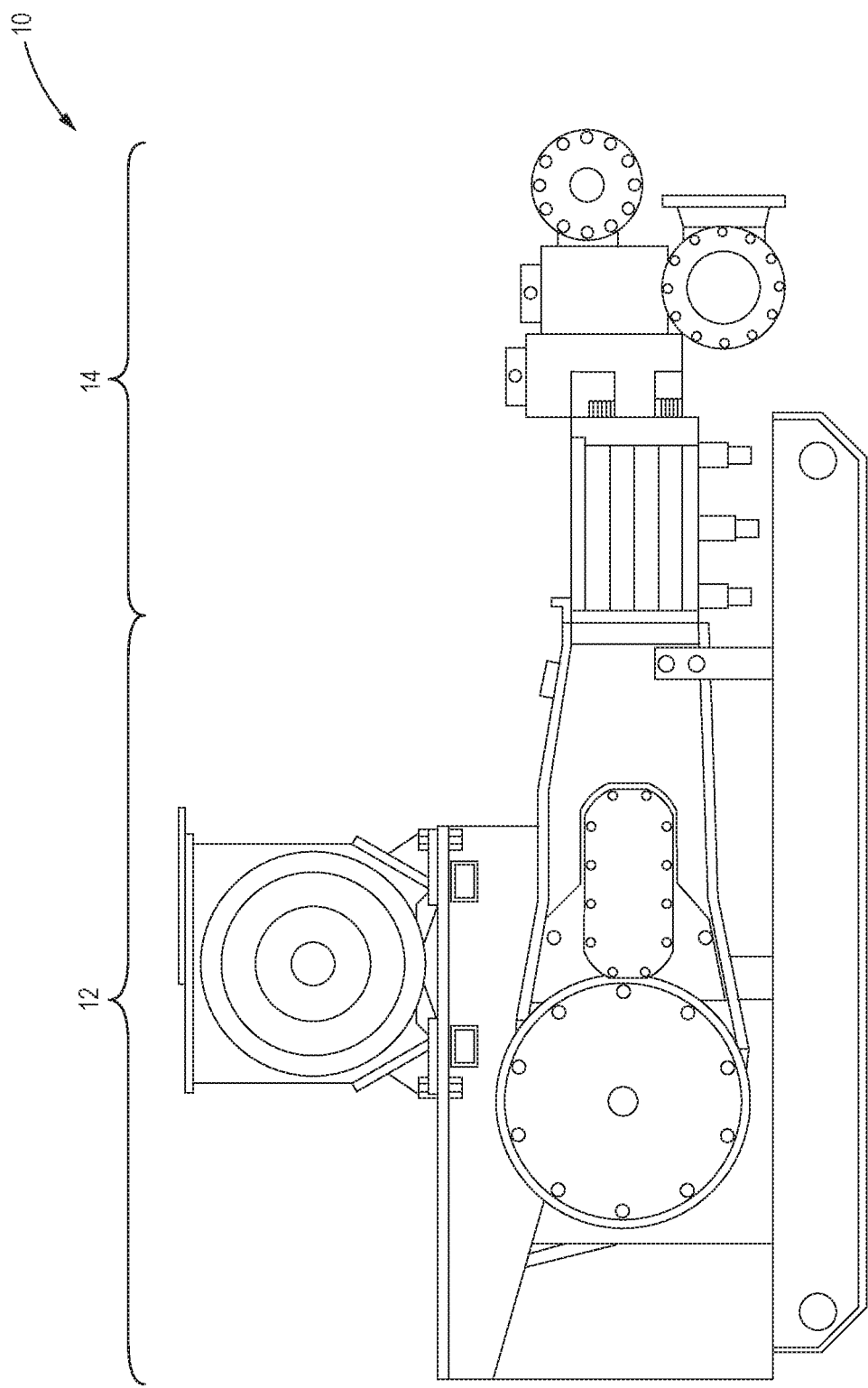
FIG. 1 is a side elevation view of an exemplary reciprocating pump, constructed in accordance with the present disclosure.

Various aspects of the disclosure will now be described with reference to the drawings and tables disclosed herein, wherein like reference numbers refer to like elements, unless specified otherwise. Referring to FIG. 1, a side elevation view of an exemplary reciprocating pump 10 manufactured in accordance with the present disclosure is depicted. As represented therein, the reciprocating pump 10 may include a power end 12 and a fluid end 14. The power end 12 may be configured to provide work to the fluid end 14 thereby allowing the fluid end 14 to propel a treatment material, such as, but not limited to, concrete, an acidizing material, a hydraulic fracturing material, or a proppant material into a gas or oil wellbore.

Figure 2:
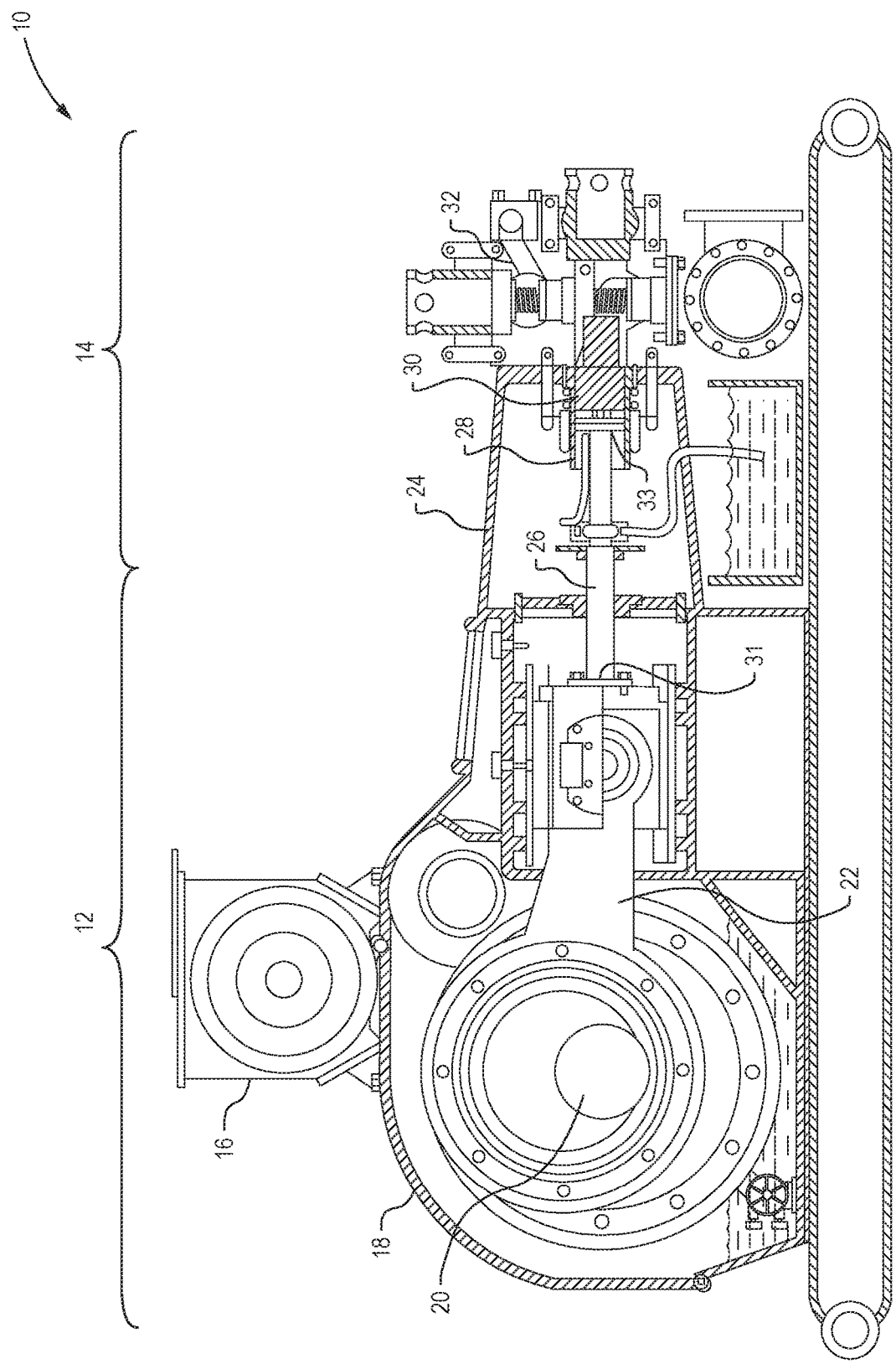
FIG. 2 is a side cross-sectional view of the exemplary reciprocating pump of FIG. 1, constructed in accordance with the present disclosure.

Referring now to FIG. 2, a side cross-sectional view of the exemplary reciprocating pump 10 manufactured in accordance with the present disclosure is depicted. As seen therein, the power end 12 may include a motor 16 configured to provide work to the fluid end 14. Moreover, the power end 12 may include a crankcase housing 18 surrounding a crankshaft 20 and a crank arm 22. The crankshaft 20 may be rotationally engaged with the motor 16, and the crank arm 22 may be rotationally engaged with the crankshaft 20.

The fluid end 14 may include a fluid housing 24 at least partially surrounding a connecting rod 26, a cylinder 28, and a plunger 30. The connecting rod 26 may include a first end 31 and a second end 33 opposite the first end 31. The connecting rod 26 may be operatively connected to the crank arm 22 at the first end 31 and to the plunger 30 at the second end 33. The cylinder 28 may be configured to operatively engage the plunger 30. While the current disclosure and drawings discuss a cylinder 28 and plunger 30 arrangement, it is envisioned that the teachings of the current disclosure may also encompass a cylinder 28 and piston arrangement. Accordingly, it is to be understood that the plunger 30 may be replaced by a piston without departure from the scope of the current disclosure.

Figure 3:
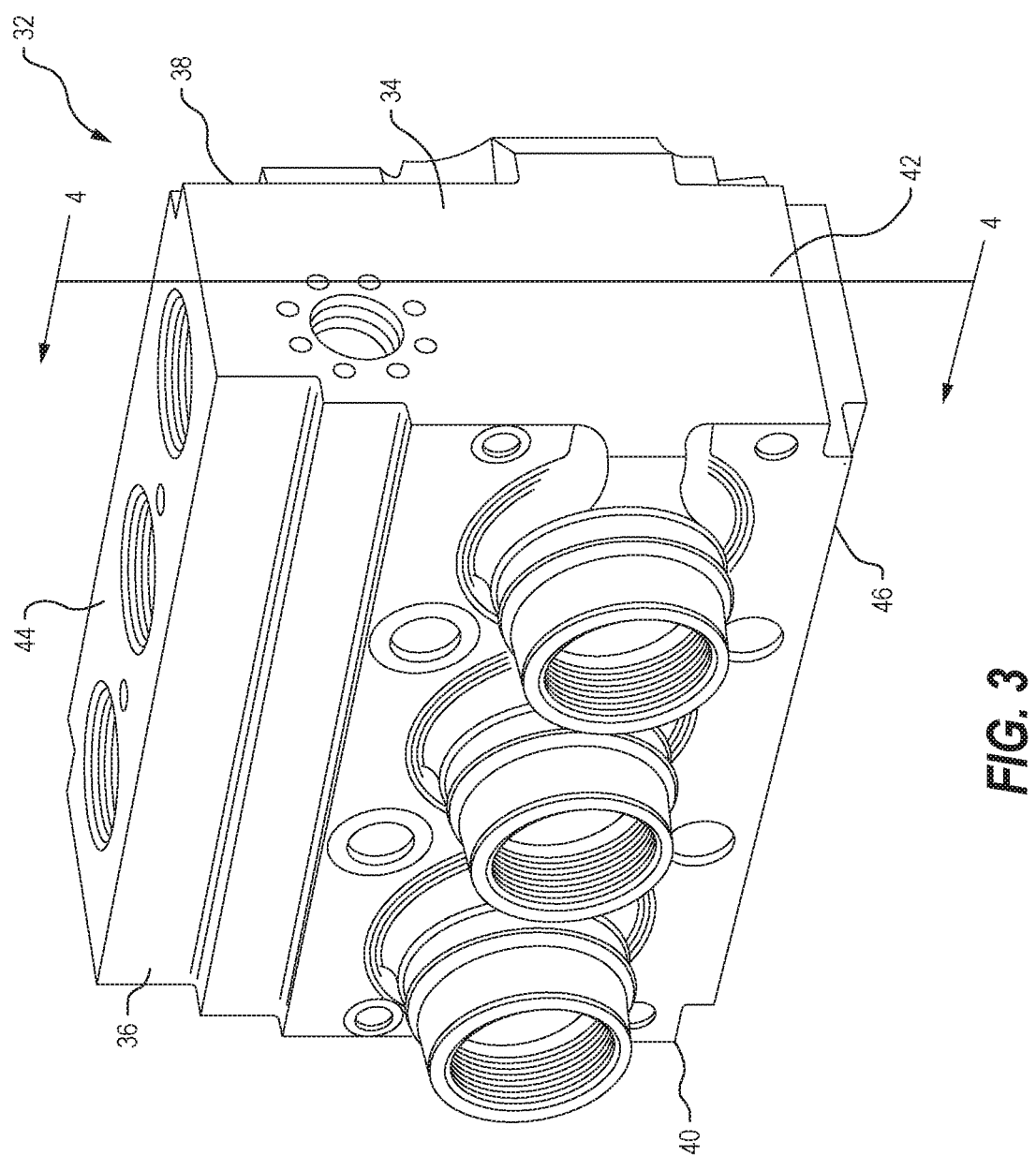
FIG. 3 is a perspective view of an end block that may be utilized with the exemplary reciprocating pump of FIG. 1, constructed in accordance with the present disclosure.

The fluid end 14 may also include an end block 32. Turning now to FIG. 3, a perspective view of an end block 32 that may be utilized with the exemplary reciprocating pump 10 of FIG. 1 is depicted. As depicted therein, the end block 32 may comprise a body 34 extending between a front side 36, a back side 38, a left side 40, a right side 42, a top side 44, and a bottom side 46. While the end block 32 depicted in FIG. 3 is a monoblock triplex design, it is envisioned that the teachings of the present disclosure apply equally as well to other monoblock designs such as quintuplex, Y-block, and even to an end block 32 having a modular design.

Figure 4:
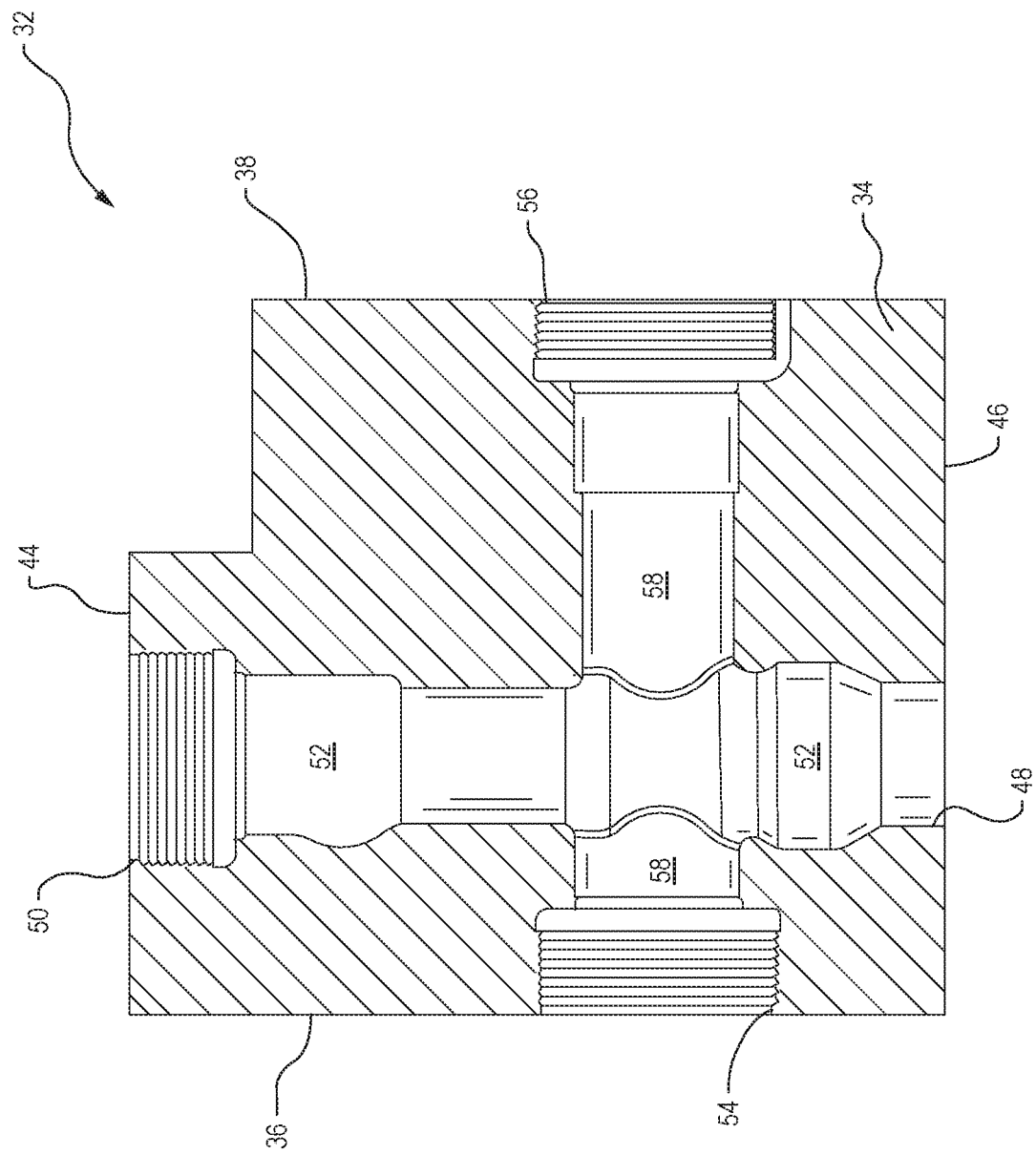
FIG. 4 is a cross-sectional view of one embodiment of the end block of FIG. 3 along line 4-4 that may be utilized with the exemplary reciprocating pump of FIG. 1, constructed in accordance with the present disclosure.

Turning to FIG. 4, a cross-sectional view of one embodiment of the end block 32 is illustrated. As depicted therein, the body 34 may further include an inlet port 48, an outlet port 50, and a first bore 52 extending between the inlet port 48 and the outlet port 50. Moreover, as depicted in FIG. 4, the body 34 may additionally include a cylinder port 54, an inspection port 56, and a cylinder bore 58. In one embodiment, the cylinder bore 58 may extend between the cylinder port 54 and the first bore 52. In another embodiment, the cylinder bore 58 may extend between the cylinder port 54 and the inspection port 56.

Figure 5:
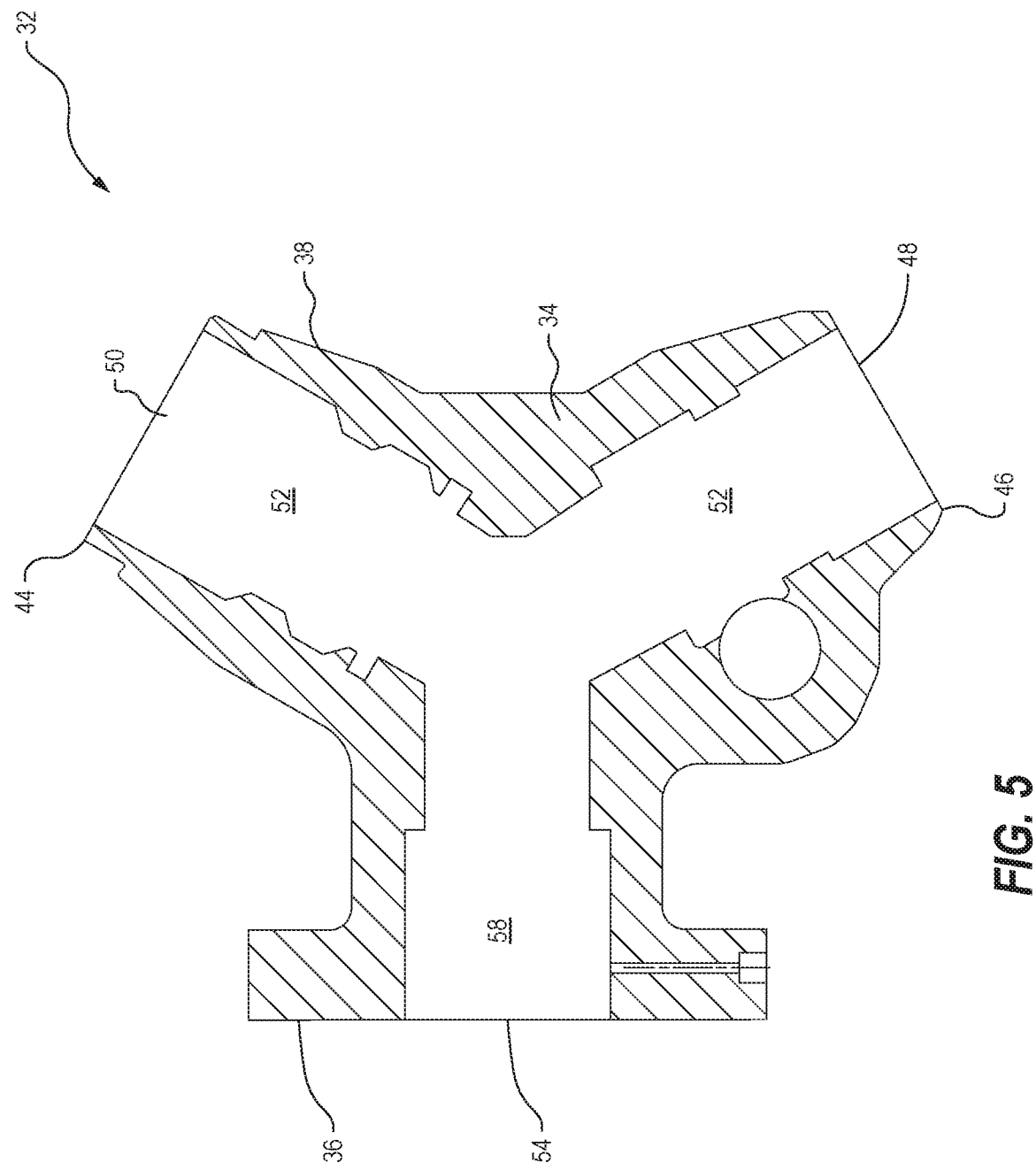
FIG. 5 is a cross-sectional view of an alternative embodiment of the end block of FIG. 3 along line 4-4 that may be utilized with the exemplary reciprocating pump of FIG. 1, constructed in accordance with the present disclosure.

Referring to FIG. 5, a cross-sectional view of an alternative embodiment of the end block 32 is illustrated. As depicted therein, the body 34 may include an inlet port 48, an outlet port 50, and a first bore 52 extending between the inlet port 48 and the outlet port 50. Moreover, as is depicted in FIG. 5, the body 34 may additionally include a cylinder port 54 and a cylinder bore 58. The cylinder bore 58 may extend between the cylinder port 54 and the first bore 52. Furthermore, as illustrated therein, an angle between the cylinder bore 58 and the first bore 52 may be other than 90 degrees, thereby giving rise to the end block 32 having a Y-block styled configuration.

In operation, the motor 16 may rotate the crankshaft 20, which may in turn reciprocate the plunger 30 inside the cylinder 28 via the crank arm 22 and the connecting rod 26. As the plunger 30 reciprocates from the cylinder bore 58 towards the cylinder 28, treatment material may be moved into the first bore 52 through the inlet port 48. As the plunger 30 reciprocates from the cylinder 28 towards the cylinder bore 58, the treatment material may be moved out of the first bore 52 through the outlet port 50 under pressure to the gas or oil wellbore.

As described above, the demand for hydrocarbon energy has increased. Accordingly, hydraulic fracturing companies have started exploring shale fields that require increased pressures and the use of more abrasive proppant materials to release the captured hydrocarbons. The higher pumping pressure and utilization of more abrasive proppant materials, such as bauxite, has decreased the service life of the fluid end 14. More specifically, the higher pumping pressures and utilization of more abrasive proppant materials has decreased the service life of the cylinder 28, the plunger 30, and the end block 32. Accordingly, the present disclosure is directed to increasing the service life of these parts.

The failure mode of end blocks and reciprocating pumps may not be completely understood. What is known, however, is that a given material, which is subjected to a combination of tensile stresses and a corrosive aqueous solution, may be prone to initiation and then propagation of a crack. More particularly, the present disclosure is directed to novel and non-obvious high toughness martensitic stainless steel compositions that are resistant to the propagation of a crack for the manufacture of the fluid end 14 of the reciprocating pump 10. That is, one or more of the components of the fluid end 14 of the reciprocating pump 10, including the cylinder 28, the plunger 30, and the end block 32, may be partially or entirely fabricated from a high toughness martensitic stainless steel composition disclosed herein. Advantageously, the high toughness martensitic stainless steel compositions of the present disclosure are corrosion resistant and exceptionally tough, making them well-suited for pump fluid ends which operate under high pressures and in the presence of abrasive proppant materials. The high toughness martensitic stainless steel compositions disclosed herein may extend the useable life of the reciprocating pump, and reduce or eliminate the susceptibility of the fluid end 14 to cracking in comparison to materials conventionally used to manufacture reciprocating pump fluid ends.

In a first embodiment, the high toughness martensitic stainless steel composition may comprise between 11.50% and 17.00% by weight chromium, between 3.50% and 6.00% by weight nickel, between 0.30% and 1.50% by weight molybdenum, between 0.00% and 0.20% by weight vanadium, and iron. For example, in this embodiment, the high toughness martensitic stainless steel composition may comprise between 0.01% and 0.20% by weight vanadium. In addition, in this embodiment, the high toughness martensitic stainless steel composition may further comprise between 0.00% and 0.06% by weight carbon, between 0.00% and 1.50% by weight manganese, between 0.000% and 0.040% by weight phosphorus, between 0.000% and 0.030% by weight sulfur, between 0.00% and 0.70% by weight silicon, and between 0.000% and 0.060% by weight aluminum. Furthermore, in this embodiment, the high toughness martensitic stainless steel composition may further comprise between 0.00% and 0.20% by weight niobium. For increased toughness, the ratio of niobium to carbon in the high toughness martensitic stainless steel composition may be 6 or less.

In the first embodiment, with the content of vanadium at the lower end of the range of 0.01% to 0.20% by weight, the maximum yield strength of the high toughness martensitic stainless steel may be below 124.0 thousands of pounds per square inch (KSI), with an minimum average Charpy "V" notch impact toughness of 90 foot-pounds when tested at minus 20° F. for the best balance of strength and ductility. Moreover, in this first embodiment, the stainless steel may have an maximum ultimate tensile strength below 130 KSI, for the best balance of strength and ductility.

In an additional embodiment, the high toughness martensitic stainless steel composition may comprise between 12.00% and 14.00% by weight chromium, between 3.50% and 5.50% by weight nickel, between 0.50% and 1.00% by weight molybdenum, between 0.00% and 0.15% by weight vanadium, and iron. For example, in this embodiment, the high toughness martensitic stainless steel composition may comprise between 0.01% and 0.15% by weight vanadium. Furthermore, in this additional embodiment, the high toughness martensitic stainless steel composition may further comprise between 0.00% and 0.06% by weight carbon, between 0.50% and 1.00% by weight manganese, between 0.000% and 0.030% by weight phosphorus, between 0.000% and 0.030% by weight sulfur, between 0.00% and 0.60% by weight silicon, and between 0.00% and 0.060% by weight aluminum. Moreover, in this additional embodiment, the high toughness martensitic stainless steel composition may further comprise between 0.00% and 0.15% by weight niobium. In this additional embodiment, the ratio of niobium to carbon in the high toughness martensitic stainless steel composition may be 4 or less to provide increased toughness.

In this additional embodiment, with the content of vanadium at the lower end of the range of 0.01% to 0.15% by weight, the maximum yield strength of the high toughness martensitic stainless steel may be below 124.0 thousands of pounds per square inch (KSI), with a minimum average Charpy "V" notch impact toughness of 90 foot-pounds when tested at minus 20° F. for the best balance of strength and ductility. Moreover, in this first embodiment, the stainless steel may have a maximum ultimate tensile strength below 130 KSI, for the best balance of strength and ductility.

The carbon in the above-described formulas may determine the as quenched hardness, increase the high toughness martensitic stainless steel's hardenability, and act as a potent austenite stabilizer. Additionally, the carbon may combine with chromium and molybdenum to form a number of metal carbide phases. Metal carbide particles enhance wear resistance and the MC type metal carbide provides grain refinement through particle pinning. Increasing the carbon level above 0.06% by weight, however, is undesirable. First, the precipitation of chromium carbides depletes the matrix of beneficial chromium which lowers the alloy's oxidation and corrosion resistance. Second, higher carbon levels can over-stabilize the austenite phase. Incomplete transformation can result from the over-stabilized austenite, which can depress the martensite start and finish temperatures below room temperature with deleterious effect on the strength of the implement.

The chromium in the above-expressed formulas may moderately enhance hardenability, mildly impart solid solution strengthening, and greatly improve wear resistance when combined with carbon to form metal carbide. When present in concentrations above 11.5% by weight, chromium offers high oxide and corrosion resistance. In practice, up to 17.0 weight % can be added without reducing the hot workability of the high toughness martensitic stainless steel.

The nickel of the above-described formulas may impart minor solid solution strengthening, extend hardenability, and increase toughness and ductility. Moreover the nickel may improve the corrosion resistance in acidic environments, and may be a strong austenite stabilizer. The nickel may increase the toughness which would be beneficial for impeding crack propogation.

The molybdenum in the afore-described formulas may improve the hardenability, increase corrosion resistance, reduce the propensity of temper embrittlement, and yield a precipitation strengthened high toughness martensitic stainless steel when heated in the 1000° F. to 1200° F. range by precipitation of fine metal carbide ($M_2C$). The molybdenum rich metal carbides provide increased wear resistance, improve hot hardness and resist coarsening below the $A_1$ temperature. Moreover, molybdenum quantities up to 1.50% by weight allow these benefits to be realized without compromising hot workability.

The manganese of the above-described formulas may provide mild solid solution strengthening and increase the high toughness martensitic stainless steel's hardenability. If present in sufficient quantity, manganese may bind sulfur into a non-metallic compound reducing the deleterious effects of free sulfur on the ductility of the material. Manganese is also an austenite stabilizer, and levels above 1.50% by weight can cause an over-stabilization problem akin to that described above for high carbon levels.

The phosphorus in the above-described formulas may be considered to be an impurity. As such, phosphorous may be tolerated to levels of 0.040% by weight due to its tendency to decrease ductility and toughness by segregating to grain boundaries. Phosphorus at the grain boundaries may have a detrimental effect on grain boundary cohesion.

The sulfur in the above-described formulas may be considered to be an impurity as it may improve machinability at the cost of a decrease in ductility and toughness. Due to the negative impact on ductility and toughness, sulfur levels are tolerated to a maximum of 0.030% by weight.

The silicon in the above-defined formulas may be used for de-oxidation during steel making. Additionally, the silicon may increase oxidation resistance, impart a mild increase in strength due to solid solution strengthening, and increase the hardenability of the high toughness martensitic stainless steel. Silicon mildly stabilizes ferrite, and silicon levels between 0.00% and 0.70% by weight are desirable for de-oxidation and phase stabilization in the material.

The vanadium of the above-described formulas may strongly enhance the hardenability, may improve the wear resistance when combined with carbon to form metal carbide, and may help promote fine grain through the pinning of grain boundaries through the precipitation of fine carbides, nitride, or carbonitride particles. Niobium may also be used in combination with vanadium to enhance grain refinement. While a vanadium content up to 0.20% by weight may aid in grain refinement and hardenability, levels of vanadium above 0.20% by weight may detrimentally decrease toughness through the formation of large carbides. The martensitic steel may comprise between 0.00% and 0.20% by weight vanadium. For example, the martensitic steel may comprise between 0.01% and 0.20% by weight vanadium.

The niobium of the above-described formulas may have a negative effect on hardenability by removing carbon from solid solution, but may produce strengthening by the precipitation of fine carbides, nitride, or carbonitride particles, and may help promote fine grain through the pinning of grain boundaries through the precipitation of fine carbides, nitride, or carbonitride particles. These finely dispersed particles may not be readily soluble in the steel at the temperatures of hot working or heat treatment so they may serve as nuclei for the formation of new grains thus enhancing grain refinement. The very strong affinity of carbon by niobium may also aid in increasing the resistance to intergranular corrosion by preventing the formation of other grain boundary carbides. To mitigate the negative effect of niobium on hardenability, vanadium may be added. The martensitic steel may comprise between 0.00% and 0.20% niobium.

A study of different precipitation hardening stainless steels identified a low toughness and a high toughness regime that were differentiated by the niobium to carbon ratio. See, Misra et al., "An Anaylysis of Grain Boundary Cohesion in Precipitation Hardened Stainless Steel", *Scripta Metallugica et Materialia*, vol. 28, pp 1531-1536, 1993. The low toughness regime was characterized by high grain boundary phosphorus concentration and the formation of niobium carbides in the grain interior. The ratio of niobium to carbon for the low toughness regime ranged from being greater than 6 but less than about 20. The high toughness regime was characterized by lower grain boundary phosphorus due to the displacement of phosphorus by carbon through site competition on the grain boundary. The segregation of carbon on the grain boundary enhanced grain boundary cohesion and negated the harmful affect of phosphorus on toughness. The niobium to carbon ratio in the high toughness regime was less than 6. Niobium additions when added in amounts that are less than 6 times the carbon content, and preferably below 4 times the carbon content, may increase toughness by improving grain boundary cohesion.

The aluminum in the above-expressed formulas may be an effective de-oxidizer when used during steel making, and may provide grain refinement when combined with nitrogen to form fine aluminum nitrides. Aluminum may contribute to strengthening by combining with nickel to form nickel aluminide particles. Aluminum levels must be kept below 0.060% by weight to ensure preferential stream flow during ingot teeming.

Example 1

The method of making the cylinder 28, the plunger 30, and the end block 32 with the high toughness martensitic stainless steel disclosed herein comprises the steps of melting, forming, heat treatment, and controlled material removal to obtain the final desired shape. Each of these steps will be discussed in more detail below.

The melting process for the high toughness martensitic stainless steel disclosed herein does not differ from current steelmaking practice. Examples of viable melting processes include, but are not limited to, the utilization of an electric arc furnace, induction melting, and vacuum induction melting. In each of these processes, liquid steel is created and alloy is added to make the desired composition. Subsequent refining processes can be used. Depending on the process used, the protective slag layer that is created for the melting process can have a high content of oxidized alloy. Reducing agents can be added during the melting process to cause the alloying elements to revert back from the slag into the steel bath. Conversely, the metal and slag could also be processed in a vessel to lower the carbon content as well as preferentially revert the alloy in the slag back into the bath through the use of an argon-oxygen decarburization (AOD) vessel or a vacuum-oxygen decarburization (VOD) vessel. The liquid steel with the desired chemistry can be continuously poured into strands or cast into ingots.

Next, the solidified strand or ingot can be formed using typical metal forming processes such as, but not limited to, hot working to a desired shape by rolling or forging. To aid in forming, the strand or ingot may be heated to a temperature in the range of 2100° F. to 2200° F. to make the material plastic enough to deform. Preferably, the deformation can continue as long as the temperature does not fall below 1650° F., as deformation below this temperature may result in surface cracking and tearing.

Subsequent to forming, heat treatment may take place in order to achieve the desired mechanical properties. The formed material may be heat treated in furnaces, such as, but not limited to, direct fired, indirect fired, atmosphere, and vacuum furnaces. The steps that the formed material requires to achieve the desired mechanical properties is exposure to a high temperature to allow the material to transform to austenite, followed by cooling the material in air or in a quench media to form a predominantly martensitic matrix, followed by a lower temperature thermal cycle that tempers the martensite. Depending on the temperature chosen, there may also be a secondary hardening effect generated by a molybdenum addition to the alloy. The high temperature process occurs in the range of 1800° F. to 1900° F. The lower temperature cycle is in the range of 450° to 750° F. or 980° F. to 1300° F. The 750° F. to 980° F. range is avoided due to the decrease in toughness and corrosion resistance when processed in this range. Typical processing uses the 980° F. to 1300° F. temperature range. Formed material processed at the lower end of this range will have higher strength, while material processed at the higher end of the range will have better ductility, toughness, and corrosion resistance. After the lower temperature cycle, material will comprise a tempered martensitic structure, and may secondarily include molybdenum precipitates.

Subsequently, the hardened formed material can be subjected to a controlled material removal process to obtain the final desired shape profile as necessary. Examples of common processes utilized to make the cylinder 28, the plunger 30, and the end block 32 from the hardened material include, but are not limited to, milling, turning, grinding, and cutting.

Example compositions of the high toughness martensitic stainless steels disclosed herein are listed below in Tables 1-2.

TABLE 1

| | Broad Range | |
|---|---|---|
| Element | % by Weight, Minimum | % by Weight, Maximum |
| carbon | 0.00 | 0.06 |
| manganese | 0.00 | 1.50 |

TABLE 1-continued

Broad Range

| Element | % by Weight, Minimum | % by Weight, Maximum |
| --- | --- | --- |
| phosphorus | 0.00 | 0.040 |
| sulfur | 0.00 | 0.030 |
| silicon | 0.00 | 0.70 |
| chromium | 11.50 | 17.00 |
| nickel | 3.50 | 6.00 |
| molybdenum | 0.30 | 1.50 |
| vanadium | 0.00 | 0.20 |
| aluminum | 0.000 | 0.060 |
| niobium | 0.00 | 0.20 |
| niobium/carbon ratio | | 6 |
| iron | balance | balance |

TABLE 2

Narrow Range

| Element | % by Weight, Minimum | % by Weight, Maximum |
| --- | --- | --- |
| carbon | 0.00 | 0.06 |
| manganese | 0.50 | 1.00 |
| phosphorus | 0.00 | 0.030 |
| sulfur | 0.00 | 0.030 |
| silicon | 0.00 | 0.60 |
| chromium | 12.00 | 14.00 |
| nickel | 3.50 | 5.50 |
| molybdenum | 0.50 | 1.00 |
| vanadium | 0.00 | 0.15 |
| aluminum | 0.000 | 0.060 |
| niobium | 0.00 | 0.15 |
| niobium/carbon ratio | | 4 |
| iron | balance | balance |

A trial heat of the high toughness martensitic steel was processed in accordance with Broad Range above. The heat was created in an electric arc furnace, where liquid steel was created and alloy was added to make the desired composition. The the metal and slag were processed in a vessel to lower the carbon content as well as preferentially revert the alloy in the slag back into the bath through the use of an argon-oxygen decarburization (AOD) vessel. The liquid steel with the desired chemistry was cast into ingots. The ingot was formed by hot working to a desired shape by forging. After forging, the material was heat treated by exposure to a high temperature to allow the material to transform to austenite, followed by cooling the material to form a predominantly martensitic matrix, followed by a lower temperature thermal cycle that tempered the martensite. To examine the lower bounds of tempering temperatures, samples were tempered at 950° F., 980° F., and 1025° F.

The chemical composition of the trial heat is shown in Table 3 below.

TABLE 3

Composition of trial heat

| Element | % by Weight |
| --- | --- |
| carbon | 0.02 |
| manganese | 0.79 |
| phosphorus | 0.015 |
| sulfur | 0.001 |
| silicon | 0.37 |
| chromium | 13.05 |

TABLE 3-continued

Composition of trial heat

| Element | % by Weight |
| --- | --- |
| nickel | 3.76 |
| molybdenum | 0.62 |
| vanadium | 0.03 |
| aluminum | 0.015 |
| niobium | 0.01 |
| niobium/carbon | 0.5 |

Figure 6:
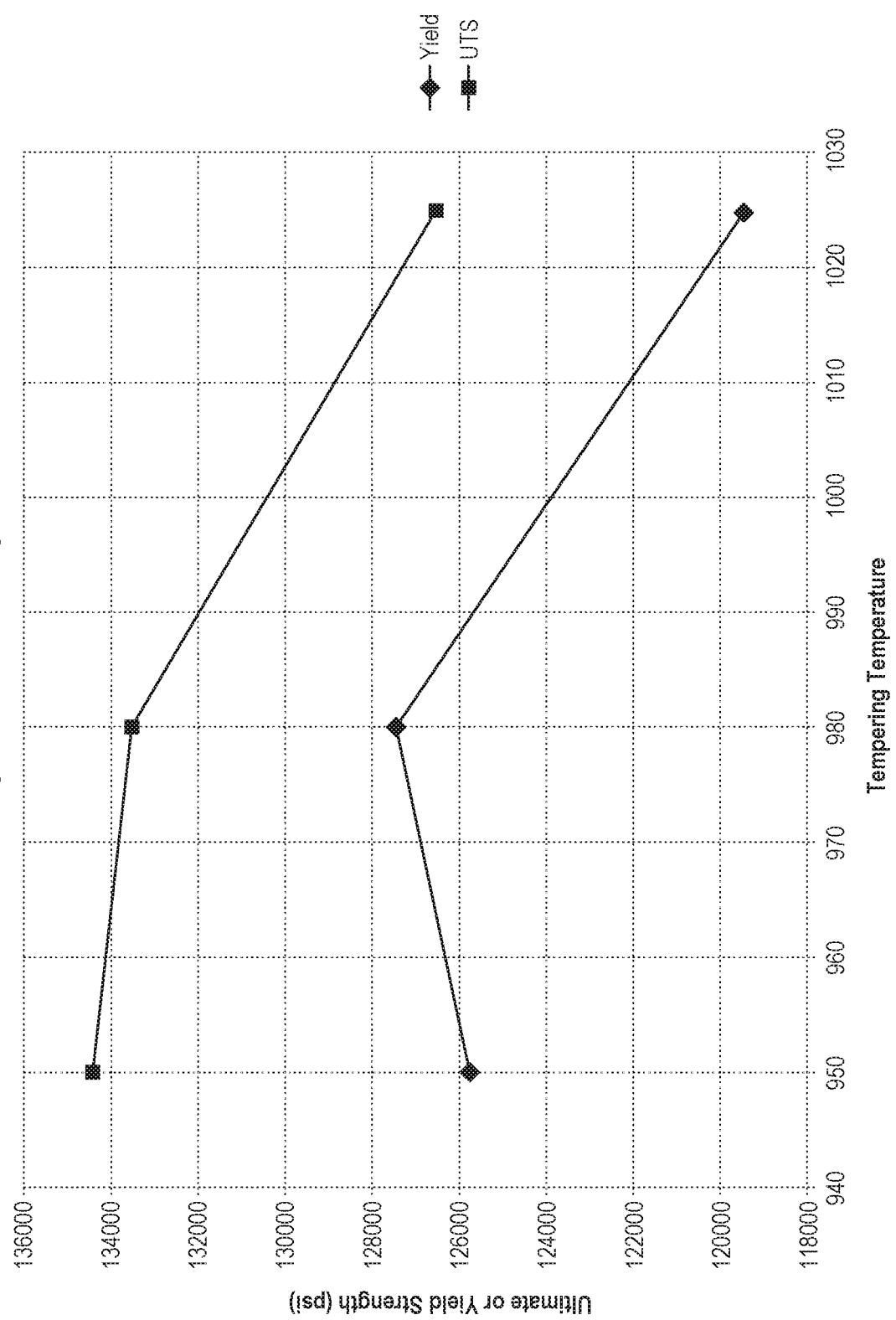
FIG. 6 is a data plot showing the effect of different tempering temperatures on the yield strength (Yield) and ultimate tensile strength (UTS) of a high toughness martensitic stainless steel composition prepared in accordance with the present disclosure.
Figure 7:
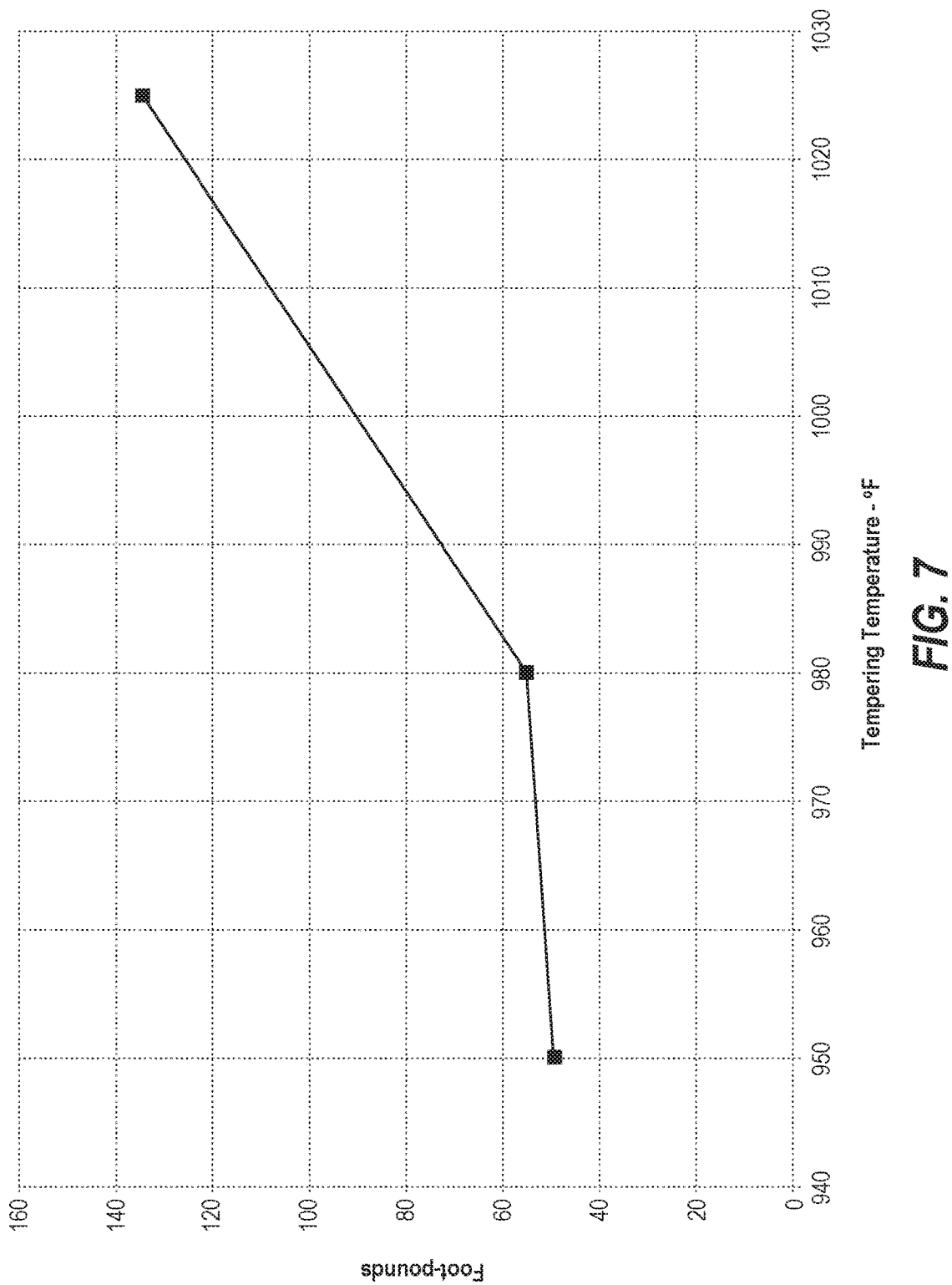
FIG. 7 is a data plot showing the effect of the different tempering temperatures on the toughness of the high toughness martensitic stainless steel composition of FIG. 6.

The results of the different tempering temperatures showed the profound effect of the tempering temperature on peak yield strength of the alloy. The results are shown in FIG. 6. The peak yield strength of approximately 128 ksi occurs at a tempering temperature of approximately 980° F. The tempering to achieve the highest strength level does have a negative affect on toughness as measured at minus 20° F. using the Charpy "V" notch impact test (see FIG. 7). Tempering temperatures above 980° F. increase the desired toughness of this composition by a significant amount. Given the desire for toughness to resist crack propagation, tempering temperatures above 1000° F. are recommended with the associated decrease in yield strength to a maximum of 124 ksi.

The addition of vanadium to the the above-described trial heat may strongly enhance the hardenability which may have the effect of minimizing the decrease of strength from the surface to the center of the implement, and the addition of niobium may produce strengthening by the precipitation of fine carbides, nitride, or carbonitride particles. In this way, the strength of the implement may increase with out a significant detrimental affect on toughness.

INDUSTRIAL APPLICABILITY

The teachings of the present disclosure can find applicability in many applications including, but not limited to, pumps designed to deliver materials under high pressure and/or highly abrasive materials. For example, such pumps may include, but are not limited to, mud pumps, concrete pumps, well service pumps and the like. Although applicable to any pump designed to deliver materials under high pressure and/or highly abrasive materials, the present disclosure may be particularly applicable to a reciprocating pump 10 used to deliver hydraulic fracturing material or a proppant material into a gas or oil wellbore. More specifically, the present disclosure finds usefulness by increasing the service life of a cylinder 28, a plunger 30, or an end block 32 of a fluid end 14 of a reciprocating pump 10 used to deliver hydraulic fracturing material or a proppant material into a gas or oil wellbore.

For example, the cylinder 28 of the reciprocating pump 10 may be partially or entirely fabricated from a high toughness martensitic stainless steel composition disclosed herein in order to increase the service life of the reciprocating pump 10. The high toughness martensitic stainless steel composition may comprise between 11.50% and 17.00% by weight chromium, between 3.50% and 6.00% by weight nickel, between 0.30% and 1.50% by weight molybdenum, between 0.00% and 0.20% by weight vanadium (e.g., between 0.01% and 0.20% by weight vanadium), and iron. In addition, the high toughness martensitic stainless steel composition may further comprise between 0.00% and 0.06% by weight carbon, between 0.00% and 1.50% by weight manganese, between 0.000% and 0.040% by weight phosphorus, between 0.000% and 0.030% by weight sulfur, between 0.00% and 0.70% by weight silicon, and between 0.000% and 0.060% by weight aluminum. Furthermore, the high toughness martensitic stainless steel composition may further comprise between 0.00% and 0.20% by weight niobium.

Additionally, the plunger 30 of the reciprocating pump 10 may be partially or entirely fabricated from a high toughness martensitic stainless steel composition disclosed herein in order to increase the service life of the reciprocating pump 10. The high toughness martensitic stainless steel composition may comprise between 11.50% and 17.00% by weight chromium, between 3.50% and 6.00% by weight nickel, between 0.30% and 1.50% by weight molybdenum, between 0.00% and 0.20% by weight vanadium (between 0.01% and 0.20% by weight vanadium), and iron. In addition, the high toughness martensitic stainless steel composition may further comprise between 0.00% and 0.06% by weight carbon, between 0.00% and 1.50% by weight manganese, between 0.000% and 0.040% by weight phosphorus, between 0.000% and 0.030% by weight sulfur, between 0.00% and 0.70% by weight silicon, and between 0.000% and 0.060% by weight aluminum. Furthermore, the high toughness martensitic stainless steel composition may further comprise between 0.00% and 0.20% by weight niobium.

Moreover, the end block 32 of the reciprocating pump 10 may be partially or entirely fabricated from a high toughness martensitic stainless steel composition disclosed herein in order to increase the service life of the reciprocating pump 10. The high toughness martensitic stainless steel composition may comprise between 11.50% and 17.00% by weight chromium, between 3.50% and 6.00% by weight nickel, between 0.30% and 1.50% by weight molybdenum, between 0.00% and 0.20% by weight vanadium (e.g, between 0.01% and 0.20% by weight vanadium), and iron. In addition, the high toughness martensitic stainless steel composition may further comprise between 0.00% and 0.06% by weight carbon, between 0.00% and 1.50% by weight manganese, between 0.000% and 0.040% by weight phosphorus, between 0.000% and 0.030% by weight sulfur, between 0.00% and 0.70% by weight silicon, and between 0.000% and 0.060% by weight aluminum. Furthermore, the high toughness martensitic stainless steel composition may further comprise between 0.00% and 0.20% by weight niobium.

The above description is meant to be representative only, and thus modifications may be made to the embodiments described herein without departing from the scope of the disclosure. Thus, these modifications fall within the scope of the present disclosure and are intended to fall within the appended claims.

What is claimed is:

1. A reciprocating pump, comprising:
    a power end having a motor, a crankshaft rotationally engaged with the motor, and a crank arm rotationally engaged with the crankshaft; and
    a fluid end operatively connected to the power end and including a plunger, a cylinder configured to operatively engage the plunger, and an end block, the plunger, the cylinder, and the end block each being fabricated from a high toughness martensitic stainless steel composition comprising between 11.50% and 17.00% by weight chromium, between 3.50% and 6.00% by weight nickel, between 0.30% and 1.50% by weight molybdenum, between 0.01% and 0.20% by weight vanadium, and iron.

2. The reciprocating pump of claim 1, wherein the high toughness martensitic stainless steel composition further comprises between 0.00% and 0.20% by weight niobium.

3. The reciprocating pump of claim 2, wherein the high toughness martensitic stainless steel composition further comprises between 0.00% and 0.06% by weight carbon.

4. The reciprocating pump of claim 3, wherein a ratio of niobium to carbon in the high toughness martensitic stainless steel composition is 6 or less.

5. The reciprocating pump of claim 4, wherein the high toughness martensitic stainless steel composition further comprises:
    between 0.00% and 1.50% by weight manganese;
    between 0.00% and 0.040% by weight phosphorus,
    between 0.00% and 0.030% by weight sulfur;
    between 0.00% and 0.70% by weight silicon; and
    between 0.000% and 0.060% by weight aluminum.

6. The reciprocating pump of claim 5, wherein the high toughness martensitic stainless steel composition comprises between 12.00% and 14.00% by weight chromium, between 3.50% and 5.50% by weight nickel, between 0.50% and 1.00% by weight molybdenum, and between 0.01% and 0.15% by weight vanadium.

7. The reciprocating pump of claim 6, wherein the high toughness martensitic stainless steel composition comprises between 0.00% and 0.15% by weight niobium.

8. The reciprocating pump of claim 7, wherein the ratio of niobium to carbon in the high toughness martensitic stainless steel composition is 4 or less.

9. The reciprocating pump of claim 8, wherein the high toughness martensitic stainless steel composition comprises:
    between 0.50% to less than 1.00% by weight manganese;
    between 0.00% to 0.030% by weight phosphorus;
    between 0.00% to 0.60% by weight silicon; and
    between 0.000% and 0.060% by weight aluminum.

10. An end block of a reciprocating pump, comprising:
    a body;
    a first bore extending through the body between an inlet port and an outlet port;
    a cylinder bore extending through the body between a cylinder port and the first bore, the body of the end block being fabricated from a high toughness martensitic stainless steel composition comprising between 0.00% and 0.06% by weight carbon, between 11.50% and 17.00% by weight chromium, between 3.50% and 6.00% by weight nickel, between 0.30% and 1.50% by weight molybdenum, between 0.01% and 0.20% by weight vanadium, and iron.

11. The end block of claim 10, wherein the high toughness martensitic stainless steel composition further comprises:
    between 0.00% and 1.50% by weight manganese;
    between 0.00% and 0.040% by weight phosphorus;
    between 0.00% and 0.030% by weight sulfur;
    between 0.00% and 0.70% by weight silicon; and
    between 0.000% and 0.060% by weight aluminum.

12. The end block of claim 11, wherein the high toughness martensitic stainless steel composition further comprises up to 0.20% by weight niobium.

13. The end block of claim 12, wherein the high toughness martensitic stainless steel composition comprises between 12.00% and 14.00% by weight chromium, between 3.50% and 5.50% by weight nickel, between 0.50% and 1.00% by weight molybdenum, and between 0.01% and 0.15% by weight vanadium.

14. The end block of claim 13, wherein the high toughness martensitic stainless steel composition comprises:
    between 0.50% and 1.00% by weight manganese;

between 0.00% and 0.030% by weight phosphorus;
between 0.00% and 0.60% by weight silicon; and
between 0.000% and 0.060% by weight aluminum.

15. The end block of claim 14, wherein the high toughness martensitic stainless steel comprises up to 0.15% by weight niobium.

16. A high toughness martensitic stainless steel composition, comprising:
between 0.00% and 0.06% by weight carbon;
between 0.00% and 1.50% by weight manganese;
between 0.00% and 0.040% by weight phosphorus;
between 0.00% and 0.030% by weight sulfur;
between 0.00% and 0.70% by weight silicon;
between 11.50% and 17.00% by weight chromium;
between 3.50% and 6.00% by weight nickel;
between 0.30% and 1.50% by weight molybdenum;
between 0.01% and 0.20% by weight vanadium;
between 0.000% and 0.060% by weight aluminum;
between 0.00% and 0.20% by weight niobium,
a ratio of niobium to carbon being 6 or less; and
iron.

17. The high toughness martensitic stainless steel composition of claim 16, wherein the high toughness martensitic stainless steel composition comprises:
between 0.50% and 1.00% by weight manganese;
between 0.00% and 0.030% by weight phosphorous;
between 0.00% and 0.60% by weight silicon;
between 12.00% and 14.00% by weight chromium;
between 3.50% and 5.50% by weight nickel;
between 0.50% and 1.00% by weight molybdenum;
between 0.01% and 0.15% by weight vanadium; and
between 0.00% and 0.15% by weight niobium,
the ratio of niobium to carbon being 4 or less.

* * * * *